United States Patent [19]

Graf

[11] 4,356,500

[45] Oct. 26, 1982

[54] DROPLET CONTROL ASPECTS—INK EVAPORATION REDUCTION; LOW VOLTAGE CONTACT ANGLE CONTROL DEVICE; DROPLET TRAJECTORY RELEASE MODES; USES FOR METALLIC INK DROPS IN CIRCUIT WIRING AND PRESS PRINTING

[76] Inventor: Ronald E. Graf, Rte. 3, Box 520, Crozet, Va. 22932

[21] Appl. No.: 255,708

[22] Filed: Apr. 20, 1981

Related U.S. Application Data

[62] Division of Ser. No. 100,953, Dec. 6, 1979, Pat. No. 4,283,730.

[51] Int. Cl.$^3$ ............................................. G01D 15/18
[52] U.S. Cl. ...................................................... 346/75
[58] Field of Search ............................. 346/75, 140 IJ

[56] References Cited

U.S. PATENT DOCUMENTS

| | | | |
|---|---|---|---|
| 4,138,686 | 2/1979 | Graf | 346/75 |
| 4,249,188 | 2/1981 | Graf | 346/75 |
| 4,264,910 | 4/1981 | Graf | 346/75 |

*Primary Examiner*—Jr. Miller

[57] ABSTRACT

In ink drop printers wherein a portion of the propelled ink from an orifice is returned for reuse and other ink selected from the issuing ink filament proceeds to an ink receiving surface, a cover is disclosed, which substantially prevents gas from leaving the selection region, unless the exiting gas or a substantially solvent saturated replacement gas is returned after ink is extracted for reuse. Thus, except for an ink extraction route, mist, satellite drops, exploded drops, evaporated solvent, and unused drops, whichever are present, are substantially prevented from leaving the cover; whereas, print droplets do leave the cover. Problems solved are ink solvent replacement, ink drying on printer surfaces such as orifices, dust entry to electrostatic areas, and external ink build up and messiness. Electrodes, or gas passing thereover, may be heated slightly to prevent solvent condensation.

Features of a selection system having no electrodes, except those washed by ink droplets are disclosed. Application of electrical voltages changes the contact angle of selected droplets, thus pulling them closer to a surface. Other droplets with the same initial conditions but to which less voltage is applied travel other paths and leave the surface at other positions. Contact configurations and departure modes are disclosed.

The third aspect of this invention deals with voltages and the formation of conducting areas covered with a dielectric and having an exposed surface upon which a selected ink, possibly metallic, will form a reasonably large contact angle. A hydrophobic layer may be added above a high voltage dielectric.

12 Claims, 12 Drawing Figures

DROPLET CONTROL ASPECTS—INK EVAPORATION REDUCTION; LOW VOLTAGE CONTACT ANGLE CONTROL DEVICE; DROPLET TRAJECTORY RELEASE MODES; USES FOR METALLIC INK DROPS IN CIRCUIT WIRING AND PRESS PRINTING

This application is a division of application Ser. No. 100,953, filed Dec. 6, 1979 now U.S. Pat. No. 4,283,730.

BACKGROUND OF THE INVENTION

The problem of ink drying on nozzles was countered by the A. B. Dick Company in U.S. Pat. No. 3,346,864 showing a nozzle cover to be used when the printer is not operating. Ricoh in Japan solved the same problem by introducing in U.S. Pat. No. 4,045,802 an automatically operating cap to seal orifices not in use.

The problem of replenishing ink solvent evaporated from returned ink was addressed by The Mead Corporation in U.S. Pat. No. 3,761,953, by A. B. Dick in U.S. Pat. No. 3,771,568, and by IBM in U.S. Pat. No. 4,130,126. Each used a different method to monitor changing ink characteristics due to solvent depletion. The most general claim, not specifying which sensing means is used, was in the Mead patent.

Evaporation occurs from all exposed ink surfaces including ink mist, satellite drop surfaces, unused drop surfaces, etc. Some of the evaporation problem, especially that associated with mist, is alleviated in the system shown in U.S. Pat. No. 4,023,182 issued to A. B. Dick. It shows a vacuum return from the region of the catcher of unused droplets. It also shows an air-ink separator. However, the air leaving the separator has become saturated with ink solvent vapor and thus represents a loss of solvent from the system.

In other patents, porous droplet catcher components, porous acceleration rings, and even porous deflection ribbons are pumped clean of ink by negative air pressure (vacuum), but in any of these systems the air traveling to the pump becomes nearly saturated with ink solvent. Thus, since air is never shown recirculating to the ink selection region, the pumping represents a loss of solvent, the corresponding pigment being returned to the system.

Recirculation of ink is shown but not claimed in U.S. Pat. No. 3,512,173 by D. E. Damouth. The recirculation had been assumed in prior art patents.

With regard to a second aspect of my invention showing a droplet selection method best suited for operation in very high vapor atmosphere without special guards against condensation, there are several examples in former art of convex surfaces being used to capture and guide droplets to a catcher. One is my own invention shown in U.S. Pat. No. 4,138,686. In U.S. Pat. No. 3,813,675 Mead Corporation shows a conductive ink guiding convex surface with channels therein, and an electric field directed toward said channel containing surface to urge charged droplets thereonto. In U.S. Pat. No. 3,836,914 Mead shows a convex drop guiding surface with changing curvature increasing toward an ingesting blade. An electric field and charged droplets are again mentioned in their claims. A third Mead catcher is shown in U.S. Pat. No. 4,035,811. In this catcher liquid of the droplets is captured by a convex surface and deflected while touching the surface more than ninety degrees from the original droplet path direction. Original droplet paths are claimed as downward and ingestion is claimed as upwardly directed.

The IBM Corporation uses a convex catching surface in U.S. Pat. No. 3,893,623 in a somewhat different way, no voltage being applied to the droplets on or before contacting the surface. They also use gravity implicitly to trap droplet splatter.

The new art of the second aspect shown in my current invention concerns new surface configurations and modes of selective release from a surface. Electrically induced changes in contact angles of droplets on a surface are used, as was the case in my former U.S. Pat. No. 4,138,686, which shows more general claims.

With regard to a third aspect of this invention, much work has been done on surface chemistry and on hydrophobic surfaces. A book titled "Hydrophobic Surfaces", edited by Frederick M. Fowkes, gives some data relevant to this patent. If an ink composed of metal is to be used, then U.S. Pat. No. 3,596,285 assigned to Teletype is relevant. It shows a low melting alloy being deposited on a steel band in the form of visible letters to be read directly. A continuous stream of liquid metal hits the band; whereas, in my invention the metal is controlled in droplet form, and the product may be used as type in a printing press or as a wiring connecting otherwise separate terminals.

Whether metal or water based ink is used, a thin (few thousand Angstrom) dielectric layer capable of withstanding 100 volts is shown in U.S. Pat. No. 3,670,130, assigned to International Standard Electric Company. This dielectric layer and similar layers can form part of the control surface which contacts ink droplets. To this I add the concept of adding an additional low energy surface coating to produce large contact angles for liquids contacting the control surface, or liquids being switched in electrostatic switches.

It is therefore one object of this invention to provide a means to prevent ink from drying on certain surfaces of a printer. It is also an object to prevent significant loss of ink solvent in unused recycled ink, the loss not being compensated for by a similar loss of ink pigment or other ink components. Some droplet selection schemes best adapted to benefit from this prevention means will be discussed.

Another object is to provide particular new aspects of a selection system claimed herein. All droplets touch a convex surface. The surface attracts the ink only weakly, with large contact angle, except when voltages are applied immediately beneath the convex surface. Thus some drops will leave the convex surface either suddenly or gradually and proceed to an output means, while other droplets will be captured by the surface and sent to a collection area. Elements of this new scheme are shown in U.S. Pat. No. 4,138,686 assigned to this applicant, but specific additions to surface design, ink surface interaction, ink used, and printer purpose are made.

Certain hydrophobic surfaces and electrically spark resistant thin layers will be claimed in combination in relation to the above selection scheme.

SUMMARY OF THE INVENTION

The first aspect of this invention discloses a cover assembly, which substantially closes a volume including the space passed through by some ink both after exiting from one or more orifices and before being collected for eventual reuse. The cover assembly is open at one or more holes or slits through which droplets selected to impact an output means will exit from the assembly. The inside of the cover assembly may be lined with a porous material for absorbing ink in the form of droplets and mist impacting or drifting onto the lining. Any catcher or electrode, which may be used to catch and collect droplets or other ink not selected for printing, would be in the volume closed by the cover assembly. Air or gaseous medium may be circulated within the assembly to cause mist to migrate to the assembly walls or to pass through a filter by which mist is removed from the gas.

The gaseous medium in the assembly, which may become saturated with ink solvent vapor, can be circulated together with accumulated ink through and from the porous material and or through an ink collecting opening, usually a slit, to a location wherein the ink can be extracted from the gas-ink mixture for eventual recirculation to an at least one orifice. If, as is possible, substantially all gas which leaves the cover assembly returns to the assembly, then very little ink solvent vapor will be lost from collected ink, and it will not be necessary to replace ink solvent lost from collected ink. The returned gas can aid droplet stream flow or aid mist collection if directed along appropriate paths. Alternatively, net loss of solvent from ink by evaporation within the cover assembly can be prevented by sending to the cover gas of similar saturation to that of the gas leaving the cover.

The cover assembly and substantial isolation of the gaseous system flowing therethrough can produce substantially saturated gas in the steady state, and therefore prevent rapid evaporation of ink solvent, and therefore prevent drying of ink on critical parts of the printer, for example the orifices. Thus the dual problems of ink drying on surfaces and of solvent loss are solved simultaneously. Further, the cover aids with respect to ink drying both during operation and during temporary shutdown of the printer.

Although the cover assembly can be adapted effectively to most selection systems shown in prior art, some selection systems would require additional precautions. Exposed electrodes, especially deflection plates and charging rings, should either be protected by gas flow or be heated above average gas flow temperature to avoid solvent condensation thereon. Alternately some vapor can be condensed prior to the pump. This is facilitated, and made natural, by the fact that compression warms gas and conversely expansion, on the low pressure side of the pump, cools gas. The cooler gas will allow vapor to condense. The gas entering the cover will be warmer than the gas from which vapor is condensed, and thus it will be less than fully saturated. Additional cooling to condense vapor before the pump or heating of gas after leaving the pump may be added.

Several examples of selection systems with adapted cover assemblies are given. The systems shown are those believed to benefit most from the cover. Many facets of one of these selection systems, including droplet release modes, are new and these form a second aspect of this invention.

Two of the selection systems described can each use some of the new droplet release modes. Further each can use a new type of layered construction for the ink contacting voltage applying surfaces, which will be claimed as a third aspect of this invention. Also specific types of compatible ink-surface combinations will be shown.

The second aspect of this invention discloses improvements on a selection method first shown in U.S. Pat. No. 4,138,686 held by this applicant. The original invention showed a convex surface upon which each droplet of a stream of droplets contacts at least two strips. Voltages can be applied immediately below the surface of each strip. Whenever sufficient voltages are applied, a droplet contacting the at least two strips is drawn toward the strips and is effectively captured by the surface. It thus travels contacting the surface longer than it would if voltage were not applied. Droplet departure points from the surface determine which droplets continue on to form an image. Droplets tend to leave the surface due to centrifugal force in the cases to be illustrated. Notice that no electrodes are necessary in this selection method other than those which are washed by each unselected droplet. Thus condensation cannot materially affect this design.

Improvements on the former design offered by this patent include the addition of the cover and recycling of the solvent vapor; a mist removing gas flow to the catcher which captures most of any mist caused by partial breakup of captured droplets, due either to bouncing or to sudden application of centrifugal forces; a vacuum system to remove unused ink for reuse; new modes of exit from surface contact; new control surface configurations; and the specific inclusion of a surface on the strips and or between the strips, which will not be wetted by the solvent, for example a water repellant surface or glass in the case of an ink comprising metal. Actually, a strongly hydrophobic smooth surface causing a reasonable contact angle between the ink-gas and the ink-solid surfaces would improve performance over that of a weakly hydrophobic surface.

In some modes of exit from surface contact the droplets leave the surface due to necking in the liquid, the necking being brought on by negative pressure within the droplet (a portion of the droplet), a pressure difference being caused from one point to another within the droplet by very high centrifugal forces. In other modes droplets leave the surface when contact area approaches zero. In some modes droplets loose contact at conducting strips (actually the surface immediately above the strips). In other modes the droplets loose contact at the surface between conducting strips. In some modes all droplets leave the conducting strips after traveling to the ends of the strips but some droplets leave lower (closer to the surface) than others. Shortly these lower droplets contact portions of surface located further on, so they can be guided along the second portion of surface. The droplets leaving higher will not contact the same second surface portion.

In some modes selected droplets, but not others, contact the median surface between conducting strips before reaching the ends of the strips. They continue contact with the continuation of the median surface after leaving the ends of the strips.

In order to provide a smooth transition from free flight to droplet motion along a strip set, a transition area may be provided at the beginning of a strip set to catch and stretch the droplet surface toward the strips. This allows the droplet to start farther from the strips and closer to its equilibrium position.

Part of some or all droplets may be left on each set of strips, depending in part on contact angle. The contact angle will almost always be low for droplets being attracted to the strips by applied electrostatic forces. Thus, since parts of at least some droplets are left behind, the selection method, when thought of in terms of particular droplets selected or not, really applies to that substantial portion of each starting droplet which holds together and any additions thereto. The starting portion of each droplet may be mixed with portions of previous droplets and may also loose portions in transit. Thus a particular droplet may grow slightly or become slightly smaller during transit. A droplet may also change form and become part of a rivulet heading toward a catcher exit.

A third aspect of this invention involves the materials of ink and strip construction, including the conducting material of the strips, the layer resistant to dielectric breakdown, and the surface material of the strips, which surface will form a large contact angle with the contacting ink surface; ink and strip surface combinations; thickness of the dielectric layer and ways to reduce the thickness to reduce operating voltage; other factors relating to operating voltage; and a use for a specific type of ink (metallic) to form printing type to be used in printing presses or to form the wiring between terminals with a dielectric surface between them before the application of an ink comprising metal, such as an alloy.

A metallic ink consisting of lead, bismuth, tin, and cadmium and melting at 158 degrees F. will, in a preferred metallic ink version, harden at room temperature after contacting and clinging to an oxide coated steel backing. Liquid ink will form a droplet stream and ride on a thin layer of glass, above an oxide layer, above a metal, in the control region. The metal can be in the form of a wire or of a flat strip depending in part on which mode of droplet departure from the strips is used in the design. Other strip designs are discussed. The choice can depend on the voltage to be tolerated or accuracy to be obtained. Control of metallic ink with less than 100 volts per strip should be possible. Note that water based ink has a lower surface energy by roughly a factor of 8. It therefore may require smaller control voltages. To get a feeling for the lower possible limit of control voltage attainable with this general design, the following facts will be stated.

A tantalum oxide coating formed by anodizing tantalum can be made to produce roughly ten times the surface energy of mercury per unit area in capacitive energy at 100 volts, without electrical breakdown of the oxide layer. Thus, at about 31 volts this same surface will produce an energy equivalent to the surface energy of mercury, which is similar to that of the other metals in question. Thus application of the 31 volts should produce a significant change in contact angle, sufficient to cause a droplet to ride lower on a strip than otherwise, or to cause a droplet to not leave a strip that it otherwise would leave. The addition of a glass layer to produce a large contact angle of ink on glass when no voltage is applied will tend to raise the operating voltage, but the layer can be made very thin, since complete coverage is not essential, as it is in the case of stopping dielectric breakdown.

Beyond applying the combination of metal, thin spark resistant dielectric, and glass outer surface to ink drop printers, the combination may also be applied in the field of electrostatically controlled switches (electrical, fluid, or optical path). These switches cause mercury or other conducting liquid to switch from a chamber to a neighboring chamber through a constricted region.

The dielectric covering the metal may be a single material such as polyethylene. Layers 0.3 mils thick are easily produced commercially, and such a layer at 700 volts would produce an electrical surface energy equivalent to the surface energy of mercury. In actual applications polyethylene and similar plastics can be made thinner by precision pressing or in some other way. The polyethylene is more appropriate for use with water based inks than with metals, since the surface tension of water is about 72 dynes/cm.$^2$ versus 540 dynes/cm.$^2$ for mercury. Thus about 240 volts at 0.3 mils thickness will produce electrical energy equivalent to the surface tension of water.

A thin dielectric plastic can be metalized in the way aluminized mylar is produced. It can then be used in an appropriate shape, such as flat or a wire shape by rolling the metalized film.

Other methods of producing thin dielectric coatings on metal are discussed. For example, a water repellent coating of linseed oil or other paint type surface or of polyethylene can be formed on top of an oxide coating, thus adding water repellency to a very thin layer very resistant to electrical breakdown. The art of capacitor formation and thin film technology is highly developed. Very thin capacitor dielectric layers highly voltage resistant are available, of which oxide coatings are only one example. A water repellent layer can be combined with other capacitor dielectrics.

BRIEF DESCRIPTION OF THE DRAWINGS

Other features, objects, and advantages of the present invention will become apparent upon examination of the following detailed description, appended claims, and the accompanying drawings in which:

FIG. 7 shows a droplet at various accelerations contacting flat strips and the surface between.

DETAILED DESCRIPTION OF THE PREFERRED EMBODIMENTS

Figure 1:
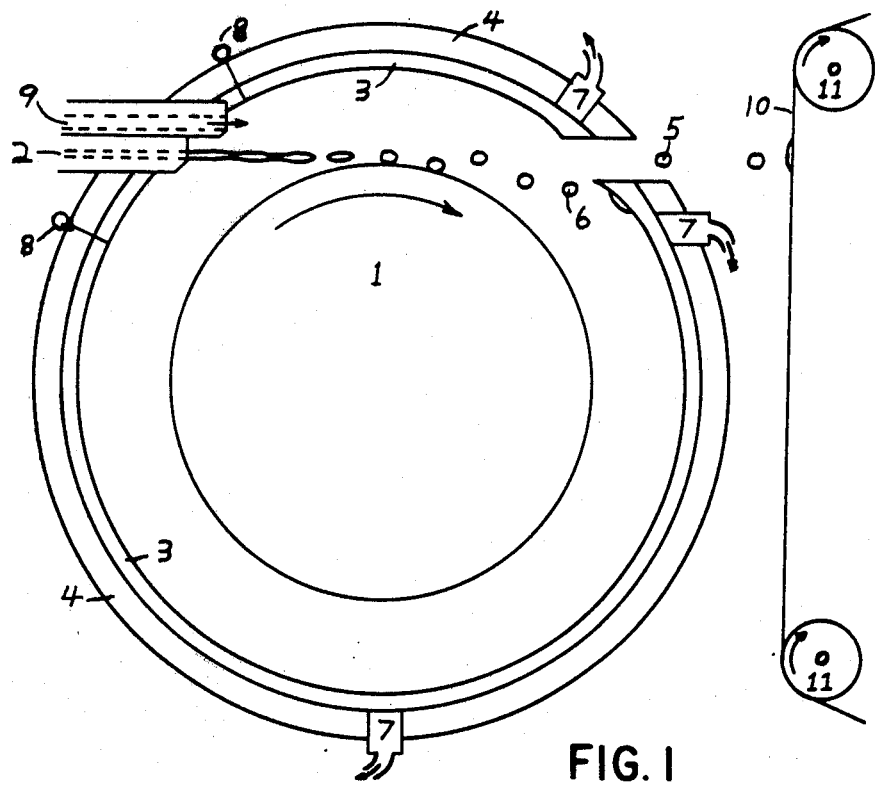
FIG. 1 shows a cover assembly and associated air flow in conjunction with a prior art droplet selector in cross-section.

As a first example, in FIG. 1 is shown a cover assembly as applied on one adaptation of a surface acting cylindrical droplet selector, which selector is first shown in U.S. Pat. No. 4,138,686 issued to the author of this patent. Improvements to and modifications of that selector design are filed as application No. 32,098 and application No. 15,802. Further improvements relating to specific inks and drum surfaces are given later as a third aspect of this invention. Improvements in drum control site construction and droplet release modes are given later as a second aspect of this invention.

Ink flows as one or more streams from orifice assembly 2. It subsequently breaks into droplets due to one of the known effects, such as vibration, or undulating voltage application, or pressure undulation, or channel constriction, or due in part to protruding site borders on the drum surface. Some of the droplets are caused, by electrostatic forces applied at sites on the surface of rotating cylinder 1, to follow a path indicated by droplet 6. These droplets remain within the cover assembly and are collected. Other droplets follow a path indicated by droplet 5 and leave the cover to proceed to an output surface shown as sheet 10 on rollers 11.

It is preferable that the ink not wet the surface of cylinder 1 in the absence of applied electrostatic forces. If the ink does wet, i.e. have a contact angle of less than 90 degrees with the drum surface, then part of each droplet may adhere to the drum. Thus when I speak of droplets proceeding to an output, I am speaking of substantially the same droplet which contacted or formed on the cylinder plus or minus a little extra ink. Some ink may or may not be left on the cylinder when new droplets arrive. The minor amounts of ink added to or subtracted from an average droplet will not be noticable on an output surface, if a proper ink-surface combination is chosen.

A porous lining 3 may be placed on the inner portion of the cover 4. It acts to collect and absorb ink droplets and ink mist. The rotation of cylinder 1 and the motion of the ink stream or streams from orifice assembly 2 both tend to cause the gas between cylinder 1 and liner 3 to rotate in the direction of cylinder rotation. The rotation of the gas causes ink mist to migrate to the lining and become absorbed.

The ink from droplets such as 6, if a separate catcher is not provided, and from ink mist is removed in the case shown by suction applied at locations 7, which locations may extend parallel to the axis of cylinder 1. The amount of suction applied at each location respectively may vary, less suction being used at locations receiving less ink. The ink and gas sucked from the cover are separated at some location (not shown). The ink is eventually returned, to be recycled through the orifice assembly, possibly after a filtering step.

The gas, which carries ink solvent vapor, is returned to the cover, in this case at location 9. Location 9 must exhaust into the covered area but need not be physically located on the cover. Alternately, new similarly solvent bearing gas may be introduced at 9. The gas flow from location 9 aids gas circulation parallel in part to the paths of the droplets. Notice that gas circulation tends to prevent any mist, formed by spattering as droplets such as 6 hit the cover or catcher, from exiting at the opening in the cover. The mist is captured within the cover because the mist would have to travel either upstream in the gas flow or for one almost complete revolution before exiting.

Some vapor may be condensed, if desired, and added to the separated ink before the gas is returned to the cover. This would protect sensitive parts from condensation within the cover, although this surface acting selector design is not very sensitive to condensation. Although gas returning to the cover after a condensation step is substantially saturated, it may be noticably below saturation and still remain within the scope of this invention being substantially more saturated than room air normally is.

The cover is shown as hinged, at hinges 8, but this is arbitrary. The cover may be attached in various other ways and at various other places. The cover and any associated parts, which come into contact with ink, should be made of a material which will not deteriorate because of ink contact. A filter may be used to remove any products of deterioration before returning ink to the orifices. Although the cover will aid in preventing dust from reaching the recycled ink, a filter would remove any dust which may get in. An oversupply of gas can be added at location 9, to cause a net flow along the path of droplet 5, to discourage dust from entering the cover.

The preferred aspect of the invention, with respect to the cover, is that gas flow in contact with ink, which ink issues from the orifices and is later to be reused, is substantially confined to a single gas containing volume. This volume includes the region between cylinder 1 and cover 4 and also includes any added system used to remove ink. In the case of FIG. 1, the added system used to remove ink includes locations 7, fluid flow lines (not shown) leading from locations 7, an ink-gas separator region (not shown), at least one fluid flow line (not shown) leading from the separator region to location 9, location 9, and any pump (not shown) necessary to move the gas. Other aspects and weaker variations are covered by and implied in the claims. These include cases wherein gas used to collect ink is not recirculated but is replaced in the cover by introducing either approximately saturated gas or gas of about equal saturation to that of the gas replaced.

A cover assembly can be adapted effectively to most selection systems shown in prior art. Those depending on free flight electrostatic deflection and using conducting ink would be especially vulnerable to the effects of condensation of ink solvent on electrostatic deflector electrodes. The field may be distorted, a short circuit may occur, droplets may contact condensed liquid, or the deflector may deteriorate. In such cases it may be desirable to heat any electrode or plate slightly above the average temperature of the rest of the droplet selector within the cover. The slightly raised temperature, if not occurring naturally, may be induced by a separate heat source. The raised temperature will prevent condensation on the electrodes, and thus prevent the associated deletrious effects. An alternate method of preventing condensation within a cover assembly is to condense ink vapor on the low pressure portion of the ink removing gas loop. If the cover assembly is at a higher pressure than that of the low pressure portion wherein vapor is condensed, then the gas within the cover will be warmer, due to compression and thus it will be less than fully saturated. The gas entering or in the cover could of course be warmed by a heater. Drying of ink on electrodes could be a problem whether or not a cover assembly is used, but gas circulation within the cover may prevent mist from reaching electrodes. The mist on electrodes is beyond the scope of the essence of this invention.

Notice, however, that mist on electrodes and condensation on electrodes does not affect the system shown in FIG. 1 appreciably, because the only necessary electrodes are on the cylinder. The electrodes on the cylinder are contacted and washed by droplets as part of the designed function of the selector. Similarly, systems using electrostatic fields to draw ink from orifices or to selectively explode charged droplets, the ink being collected on the rings after selective explosion may also benefit from a cover assembly and gas pumping system to remove ink from the porous rings normally used. The pumped gas, in a preferred method will be returned to the cover assembly to avoid solvent loss.

Figure 2:
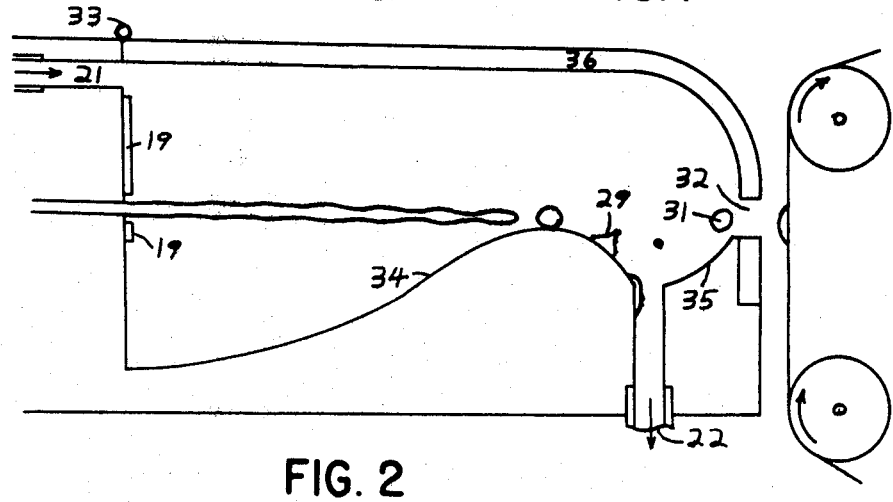
FIG. 2 shows a second cover assembly and an associated gas flow orifice and exit, the whole being designed to cooperate with a second prior art droplet selector.

A second somewhat detailed example of a selection system well adapted to benefit from the addition of a cover assembly is shown in U.S. Pat. No. 3,893,623 by Toupin of IBM. This system is shown because it uses no electrodes, except those at the orifices. The electrodes are used to form droplets at a controlled frequency and amplitude. Thus the system is intrinsically less sensitive to vapor condensation than some other systems. The selection method causes some droplets, such as droplet 31 in FIG. 2, to miss at the closet approach of the ink trajectory to surface 34. Other droplets, such as droplet 29, contact surface 34 and are pulled by a combination of adhesion and air motion forces toward the surface. Electrodes 19 respectively each surround an orifice. Modulation of the voltage on these electrodes breaks the stream of ink into droplets. In one selection method larger droplets, formed over a longer period, contact surface 34; whereas, smaller droplets traveling the same trajectory but formed over a shorter period of time do not contact the surface. Droplet size depends upon the amount of ink exiting from an orifice during droplet formation, the period of which is varied. In an alternate selection scheme, described by Toupin, droplets formed by larger voltage variations hit the surface 34, while those formed with smaller voltage variations, but of the same duration, miss the surface and may also break later from the stream.

Those droplets defected by surface 34 may break up for a combination of reasons, and parts of those droplets will hit surface 35. The deflected droplets and parts thereof are collected at the hole (slit) between surface 34 and surface 35, being pulled down by gas exiting through 22.

The improvements added to Toupin's design are as follows. A cover 36 is provided. The cover hinges at hinge 33. After ink to be recirculated is separated from the gas leaving at exit 22, the same gas or an approximately equally saturated gas is returned at entrance 21. Thus after eqilibrium is established solvent vapor, which has entered the gas, or an approximately equal amount of solvent vapor, is returned to the cover assembly. The solvent will of course evaporate more slowly from ink after the gas becomes nearly saturated and evaporation may even reverse, so that some solvent condenses back into ink, especially if the ink exiting from orifices is kept at a lower temperature than the covered region. The gas flow resulting from gas leaving at exit 22 and gas entering at an entrance 21 aids motion of the ink streams and also tends to prevent mist and ink splatter from leaving slit or opening 32. The gas flow also tends to keep the cover 36 free of ink, since a gas stream sweeps along parallel to the cover surface, on the way from entrance 21 to exit 22.

Notice also that the cover is curved above the slit to encourage gas flow across the slit. Also, if necessary, the cover can be lined with a porous material and pumped free of ink at an exit similar to location 7 of FIG. 1. Spacers may be provided at the ends of slit 32 to allow the cover to be closed without closing the slit, i.e. the upper art of the slit is on the cover and the lower part of the slit is attached to or part of the block having surface 35.

A third somewhat detailed example of a selection system well adapted to benefit from the addition of a cover assembly is an improvement on a selection system shown in U.S. Pat. No. 4,138,686 assigned to the author of this patent application. Some of the improvements are independent of the cover assembly, and these wil be claimed separately, as a second and third aspect of this invention. Most of these improvements will also be applicable to the selection system shown in FIG. 1.

Figure 3:
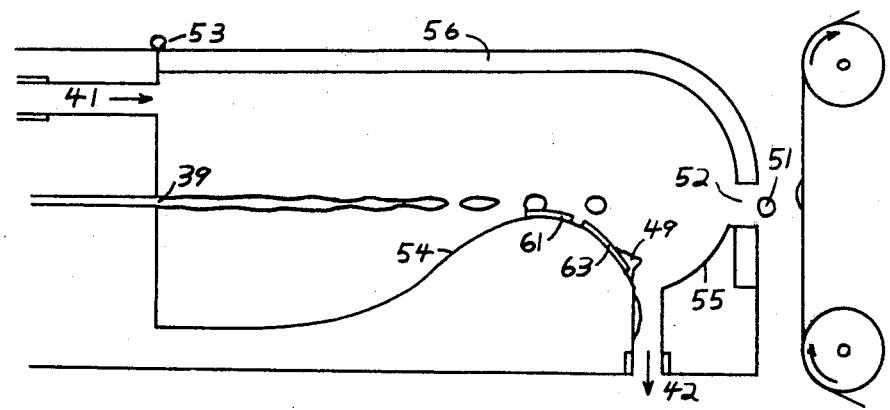
FIG. 3 shows a third cover assembly and associated gas flow means. The droplet selector combines some features of prior art with some new features.

Refering to FIG. 3, ink exits from one or more orifices 39 and separates downstream into droplets one of which is droplet 51. The streams may be excited to form droplets in a number of ways shown in prior art. Element 61 represents multiple conducting strips contacted by portions of the ink in the streams. If the phase of droplet formation varies from stream to stream, then the streams and elements 61 in FIG. 3 may be offset vertically by compensating amounts. If the streams are offset vertically, then droplets from each stream can, with proper offset, contact a vertically travelling output medium along a straight line on the output medium, even though the droplet arrival times at the output medium may be different due to differing phases of droplet formation. Depending on the application it may not be necessary for droplets to impact along a straight line, and if this is desired it might be best to excite all the streams with the same phase.

The following will give a feeling for dimensions involved. Depending on design, as discussed below, if the droplets travel at 800 inches per second, and are 0.002 inches in diameter, then droplets may contact the strips (elements 61) individually along an arc of about 0.008 inches and having a radius of curvature along the strip of about 0.08 inches. This implies that the strip curves away from a tangent to itself roughly 0.008 inches during droplet contact. Thus a droplet contacting the strips along this distance and being pulled toward the strips can move about half a droplet radius from a straight line path during contact. For larger droplets dimensions will be raised. The speed and path curvature causes a centrifugal force of roughly 20,000 gravities. As discussed later, this causes a pressure difference across the droplet of about twice the pressue due to surface tension within the head of the droplet. Thus the shape and curvature of a droplet surface changes drastically.

Figure 4:
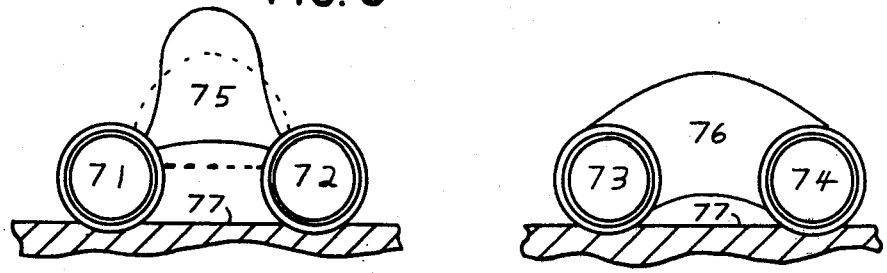
FIG. 4 shows a cross-section of droplets 75 and 76 being controlled by strips 71 through 74, the cross-section being viewed along the direction of droplet travel, the strips possibly corresponding to strips 61 of FIG. 3, the strips possibly being placed on the circumference of drum 1 of FIG. 1 with their length being along their direction of motion.

FIG. 4 shows a cross-section of a pair of strips 71 and 72 acting on the ink 75 of one stream, and another pair of strips 73 and 74 acting on the ink 76 of a second stream. At least two strips, 71 and 72 for exampled, act on a portion of ink simultaneously. The portions of ink acted upon may be thought of as droplets, although small parts of a droplet may be left behind on a strip and may merge with the next droplet coming along. I will use the word droplet to descried a portion of ink which is at some time contained within a small volume, of the order of a few stream diameters, and which substantially acts as a unit, substantially travelling in a connected fashion to the same place, after leaving an orifice, possible loosing small parts from itself and or gaining small parts to itself, and possibly flattening along a strip to eventually become part of a rivulet passing into a collection orifice. Among droplets being collected two successive droplets may merge, because the second one will catch up to the tail of the first one.

The materials of the ink and the material of the surface of the strips are preferably chosen so that the ink will not wet the surface, i.e. so that the contact angle will be approximately 90 degrees or larger. Detailed contact surfaces and inks will be mentioned later, but a preliminary glance will now follow. A liquid metal, either mercury or some molten metal alloy will not wet a glass coating, since glass attracts mainly polar molecules, such as water. U.S. Pat. No. 3,596,285 issued to Teletype shows a melted metal alloy being used as an ink.

If the ink solvent is water, and if an oxide coated metal is used as a component for the strips, and if no surface acting agent is added to the surface or the ink to coat the oxide with a hydrophobic layer, it may be possible to add a waterproofing layer to the surface, depending on the oxide. Both the textile and the paint industries work with surface coatings. For instance, metal oxide pigments in paint can be coated with layers of linseed oil averaging 150 Angstroms in thickness. When linseed oil, properly treated, dries it forms long linked macromolecules, and becomes like a plastic. This could be done on the surface of a wire, precoated with a uniform oxide coating. Many other hydrophobic surfaces are available, carbon, polyethylene, polypropylene, teflon, and some other polymers being some examples. Hydrophobic surfaces and the effects of contact angle and of specific configurations of droplet contacting surfaces will be discussed later in more detail. A water based ink can be made ionically conducting by adding a proper electrolyte, which will not react appreciably with the final surface coating on the strips.

Returning to FIG. 3, if a droplet is selected to leave surface 54 and proceed to leave the cover 56, such as is the case for droplet 51, then no electrical voltage is applied between the contacted strips. Thus the strips represented by element 61 in FIG. 3 and simultaneously by strips 71 and 72 in FIG. 4 will apply no voltage across the droplet labelled 75 in FIG. 4.

The actions upon the droplet 75 produced by the strips, in the absence of applied voltage, are a small surface pressure at the surface of contact, possibly a small amount of adhesion, and a frictioal shear force at the surface of contact. Air pressure and centrifugal force and droplet internal pressure also act upon the droplet. The air pressure and liquid cohesion prevent the droplet from splitting at any area internal to the droplet, in the absence of extreme vibration or a negative pressure wave. Thus for a part or the whole of the droplet to break away into free flight, contact with another part of itself or contact between the droplet and the surface of a strip must become a negligible area (necking must occur).

The dotted line droplet 75 is produced by lower centrifugal force than the solid droplet 75. A further increase in centrifugal force will cause the contact between droplet and strips to become a negligible area. Centrifugal force is a function of both droplet speed and path curvature, in this case the curvature of surface 54 in FIG. 3. The surface curvature may be varied. The initial curvature should be appropriately chosen and curvature as viewed in FIG. 3 may vary along the strips. If a droplet is not selected to leave the surface, as is the case for droplet 76 in FIG. 4, then its area of contact with strips 73 and 74 is increased by the application of a respective voltage between the droplet and each respective strip. This counteracts the tendency of centrifugal force to decrease the contact area.

Figure 9:
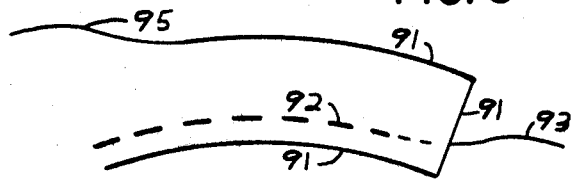
FIG. 9 shows a side view of the strips of FIG. 8. The droplet will travel from left to right in the figure. The dashed line is surface 77 between the strips.
Figure 10:
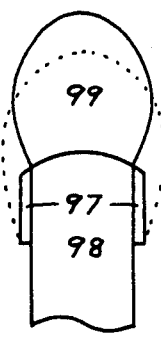
FIG. 10 shows a cross-section of two strips 97 on opposite faces of a ribbon 98 and possibly stable droplet positions with and without voltage applied, all viewed in the direction of droplet motion.

Beside the method of droplet departure depicted in FIG. 4, which assumes a contact angle of the droplet with the strips of greater than 90 degrees other methods can be applied. These are illustrated in FIGS. 5 through 10. All methods except that shown in FIG. 8 can also apply to methods of selective lift off from the sites on the surface of the rotating drum shown in FIG. 1. In fact the method shown in FIG. 8 and the method shown in FIG. 10 are probably best for configurations using stationary strips; whereas, the methods shown in the other figures are best for a rotating drum configuration. Each of the sites on the drum might consist of two side by side strips, roughly two or three droplet diameters long, and about the same distance apart as those shown in FIGS. 4 through 11, perhaps half a droplet diameter apart.

Figure 5:
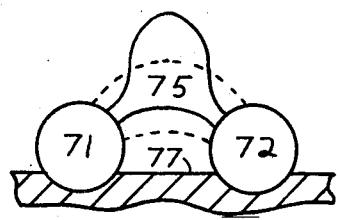
FIG. 5 shows part of FIG. 4 in the case when the liquid 75 partially wets the strips. The dashed lines show a droplet outline for lower acceleration than that producing the solid lines.

The contact angles of the droplet 75 on the strips in FIG. 4 were drawn assuming that the ink does not wet the surface of the strips, and thus contact angle was drawn greater than 90 degrees. FIG. 5 shows the case where the contact angle is near but less than 90 degrees, with not voltage applied. No voltage is applied and the dotted lines represent droplet boundaries when low centrifugal acceleration is applied. Notice that necking in the droplet occurs when acceleration is larger, as shown by the solid droplet boundary. Thus part of the droplet may be left on the strips, in this case, when the rest of the droplet breaks away.

The instantaneous curvature of the droplet boundary varies approximately as a function of the coordinate in the acceleration direction and other factors such as acceleration magnitude. In some cases the curvature varies from convex to concave, as a result of very high acceleration magnitude. For instance, if the droplet stream is produced by a pressure of about two atmospheres, and travels at 64 feet/second, around a surface with a 0.08 inch radius of curvature, then the droplet acceleration will be approximately 20,000 times that of gravity. The surface may be stationary or mve with the droplet, as in the case of the drum of FIG. 1. Surface tension of a water droplet at a point where the radius of curvature of the water surface is 0.001 inches, as might be typical at the outermost tip of a droplet, produces a tension induced pressure of about 300,000 dynes per square inch, or about three fourths pound per square inch, or about 1/20 atmosphere. This is a pressure equivalent to that produced by a 1.5 foot high head of water at normal Earth gravity. Dividing by 20,000 gravities gives 0.0009 inches as the equivalent head of water necessary to produce the pessure difference equivalent of the tnesion pressure produced by a 0.001 inch radius of curvature in a water droplet surface. Therefore, as we travel down from the droplet surface point farthest from the strips a distance of 0.0009 inches, the surface radius of curvature can change from 0.001 inches to a very large radius producing a flat surface. As we travel further in the acceleration direction, and further approach the strips, the surface curvature can become negative, implying a negative pressure within the droplet. The preceding discussion assumed that the ink was water based. If metallic ink is used, then both the specific gravity determining acceleration force and the surface tension of the liquid increase. Their effects tend to cancel, thus implying similar operating dimensions.

Figure 6:
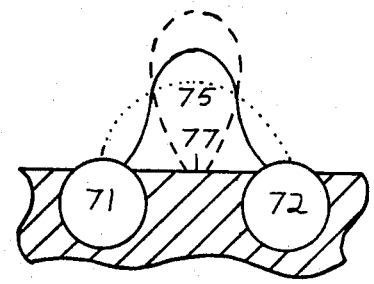
FIG. 6 is similar to FIG. 4 but shows droplet cross-sections at various accelerations when the droplet contacts a surface between two control strips.

FIG. 6 shows a case where the contact angle on the strips is less than but near 90 degrees, and the contact angle on a dielectric surface 77 in between the strips, which may be made of polyethylene, is greater than 90 degrees. Droplet 76 hugs the surface because a voltage is applied. However no voltage is applied to droplet 75. Droplet 75 is shown at three different accelerations. The dotted line shows low centrifugal acceleration. The solid line shows an a acceleration higher and almost sufficient to cause the droplet to disengage from the strips. After disengaging from the strips the droplet might temporarily look like the dashed line and will shortly leave the surface. The configuration of the strips and their platform in FIG. 6 has other advantages besides causing an easy droplet departure. The configuration also reduces the chance of sparking discharge between the strips, because a dielectric is interposed between the strips at their point of closest approach. Of course, if the strips are each covered with a good dielectric layer sparking will be prevented anyway. If droplets tend to resist contacting both strips upon arrival at the surface, they can be forced to contact both strips by using a component of droplet velocity toward the strip bearing surface.

The number 77 is used generally to denote the surface between strips, and this surface can have some shapes of its own. The surface 77 between strips 73 and 74 in FIG. 6 is shown as rising to a ridge under droplet 76. This ridge and the concomitant slanting of the surfaces on either side of the ridge could be used to facilitate droplet departure. If the contact angle were 80 degrees and each side slopes up to the ridge at 10 degrees then the liquid surface at contact will point straight up in the figure. If the slope up to the ridge were zero, i.e. no ridge were to exist, then a contact angle of 90 degrees would be necessary to cause the liquid surface at contact to point straight up in the figure. Thus as the slope to the ridge is raised, the contact angle to allow departure of a droplet can be lowered.

As another refinement of the strip configuration, the middle portion of surface 77 could also have an electrifiable strip thereon. The voltage between the center strip and either of the strips, relative to the other voltage difference, could be altered to produce sideways motion of the droplet toward either side strip from the center. This sideways motion can be used to spread the impact points of droplets held a short time.

Figure 7:
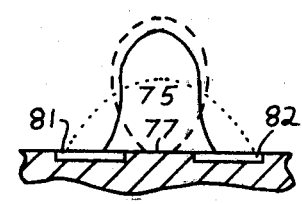

FIG. 7 shows a simple configuration using flat strips 81 and 82 to control droplet 75. The drawing shows the strips forming a contact angle of less than 90 degrees with the droplet. The surface between the strips will form a contact angle of greater than 90 degrees with the droplet. Only the release mode is shown in FIG. 7 as was true in FIG. 5, so no voltage, or at least lower voltage is used on droplet 75 than that voltage necessary to hold the droplet to the surface. Again the dotted line represents the droplet outline for low acceleration, the solid line for higher acceleration, and the dashed line represents the droplet configuration after loosing contact with the strips. Notice that the droplet contact area can become zero on surface 77. It will become zero if the acceleration is chosen high enough.

If the strips in FIG. 7 were replaced by rectangular strips of finite thickness protruding from the surface, for example the strips being formed of square cross-sectioned wire, and if the droplet never touches the surface between the strips, and if the droplet does not move by capillary action between the opposing strip surfaces because pressure in the droplet part trying to move between is negative, then droplet departure would be facilitated even though the strip surface might have a contact angle smaller than 90 degrees. There are many possibilities and only two more will be mentioned in detail.

Figure 8:
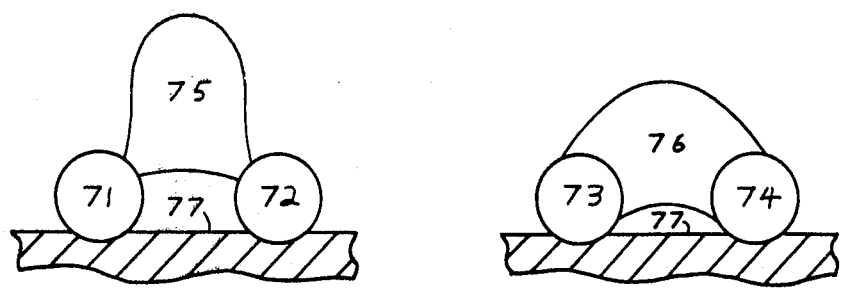
FIG. 8 shows droplets riding at two different levels depending on whether voltage is applied or not.

FIG. 8 shows the cross-section of a pair of wire strips 71 and 72 touched by droplet 75 with no voltages or low voltages applied to the system. Higher voltage is applied across wire strips 73 and 74, thus causing a voltage between droplet 76 and each strip. Thus for the substantially same centrifugal force droplet 76 rides lower in the figure than droplet 75. At a certain point along each pair of strips the strips stop. This is shown in FIG. 9, where 91 is the outline of a pair of wire strips, one behind the other, so that only the one can be seen. The surface between the strips is represented by dotted line 92 in FIG. 9 and by line 77 in FIG. 8. Surface is the continuation of surface 92, and it may or may not rise after leaving the ends of the strips. Since droplet 76 rides lower than droplet 75 in FIG. 8, the surface 93 can, if properly positioned, i.e. raised, contact and capture droplet 76 but not contact droplet 75.

Alternately, the surface represented by 77 and 92 can be raised to contact droplets such as droplet 76 acted upon by a relatively high voltage between the strips, while not contacting droplets such as droplet 75 acted upon by no voltage or by a relatively low voltage between the strips contacting the droplet. In this case droplets such as 75 can fly off the ends of strips without contacting surface 92 or surface 93. Droplets such as 76, which contact the surface represented by 77 and 92 while between the strips will continue to maintain contact with the surface represented by 93 after leaving the strips, and they can be led eventually to a gutter. Thus droplets forced to contact surface 92 by a sufficient voltage will go to a collector, while droplets not forced to contact surface 92, because less voltage was applied to them will not go to the collector but may proceed to an output medium. In this case, surface 93 need not be raised with respect to a continuation of surface 92. The surfaces 92 and 93 can be of any useful composition, wettably or not. They may even be porous and pumped to remove ink.

FIG. 10 shows a cross-section of a droplet 99 in contact with a pair of strips 97, the strips being located on opposite sides of a thin dielectric ribbon, the ribbon being preferably of a substance on which the ink forms a contact angle greater than 90 degrees if the droplet is to drift upward and off the ribbon. If the droplet is to stabilize at the upper edge of the strips, then the contact angle with the ribbon should be less.

Figure 11:
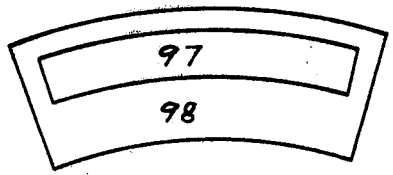
FIG. 11 is a side view of the strips and ribbon of FIG. 10.

Dielectric 98 may be in the shape of a washer, i.e. the outer ring of a disc, or it may be only a segment as shown in FIG. 11, which is a side view perpendicular to the implied view of FIG. 10. Centrifugal acceleration is mainly upward directed in both figures. The dotted outline of droplet 99 is formed when a voltage of sufficient magnitude is applied between strips 97. The droplet can be made to drift down to the position shown, neglecting motion into or out of the figure. When no voltage or insufficient voltage is applied, the drop 99 forms an outline similar to the solid line. In this voltage state the droplet will drift upward and can be made to drift off the dielectric ribbon, if the surface of strips 97 is of a material causing a reasonably large contact angle of the droplet on the surface, and if the same is true of the ribbon surface. The strips will probably be a few droplet diameters in length, and in the case of a drum may be alternately electrically connected in a repetitive manner around the periphery of a dielectric washer or disc.

With this strip configuration several modes of droplet departure are possible. The droplet may be held by voltage and released by lowering voltage at any reasonable distance along its arc of travel, the distance being determined by the duration of holding voltage. The lowering of voltage will cause the droplet to begin drifting upward and off. Droplets held longer may be guided to a gutter or later released to fly to a gutter. Droplets held shorter than a specified time may also be sent to a gutter, while only droplets held for periods in a time window are allowed to proceed to an output surface.

Alternately the strips and or ribbon may end, so that a droplet is always and abruptly released when it reaches the ribbon or strip end. Since droplets acted upon by voltage during contact with the strips will be riding lower, they may be treated differently after leaving the ribbon from the way droplets not acted upon by voltage are treated. For instance, they may contact different surfaces after leaving the ribbon. If the ribbon surface causes a smaller contact angle than the strip surface, then the surface of droplets to which no or small voltage is applied may stabilize extending to the upper strip border, as shown by the solid line of FIG. 10.

If the ribbons 98 are located on the surface of a rotating drum or any rotating structure, then successive ribbons to be contacted by successive droplets of a stream may be oriented differently with respect to the drum rotation axis, in order to impart changes of position and velocity to droplets in the direction of the rotation axis. If the drum moves slower or faster than the droplets, then the droplets may depart from the ends of the ribbons, and these ends may be displaced along the drum axis by varying amounts for successive ribbons. This can give successive droplets different position and velocity components along the drum axis, at the time they leave the ribbons.

If droplets are to lift off from ribbons but not at ribbon ends, then the point in a revolution at which selected droplets are released can be chosen as well as the point at which unselected droplets are released. In this case, each droplet can be subjected to an initial voltage and the position of voltage reduction or removal determines where a droplet is released.

The droplet arrival at the ribbons should be with sufficient impact parameter to cause the droplet to reach the strips 97, so that voltage can then act to change the contact angle; or the surface of ribbon 98 contacting the droplet should have a sufficiently small contact angle to draw droplets to the upper strip borders. The alternative used depends partly on the mode of droplet release desired.

The discussion above of the figures showing droplet shapes has assumed an equilibrium condition is maintained. Actually, when a droplet first touches strips 61 of FIG. 3, its shape is not an equilibrium shape of a droplet traveling along the strips. The approach to equilibrium and the onset of rapid acceleration due to pulling by the strips can be speeded by adding a raised surface at the point of first droplet contact to the strips, such as surface 95 in FIG. 9. Thus the droplet center of gravity can be raised closer to its equilibrium path distance from the strips at the time it contacts the strip surfaces. The droplet surface will be stretched by surface 95 to contact the strips. Notice in FIG. 4 that the solid line droplet 75, which is shaped similarly to a droplet in dynamic equilibrium has a center of gravity further up than the dotted line droplet 75, which dotted droplet represents low acceleration and looks more like a droplet would look at the moment of first contact with the strips, if the extra surface 95 of FIG. 9 were not added. Thus 95 provides a smoother transition to dynamic equilibrium. Of course, most droplets may never reach dynamic equilibrium except in the case illustrated by FIG. 9, or the case illustrated in FIG. 11 in which the droplet launches from the ends of the strips. The figures are meant to be intuitive and suggestive. Actual droplets may never take on an exact equilibrium state, but there is a tendency toward these states.

If the method of selected droplet release shown in FIG. 9, and possibly in FIGS. 10 and 11, wherein the droplets abruptly leave the ends of the strips, is used, then it is not necessary to use a strip curvature large enough to cause a droplet to drift up and off a pair of strips before the strip ends are reached. The curvature must merely be sufficient to cause a difference between the levels at which droplets such as 75 of FIG. 8 and the levels at which droplets such as 76 of FIG. 8 ride on their strips. Droplets such as 75, to which less or no voltage is applied, are not pulled as low as droplets such as 76, which have a greater voltage applied between their strips. If the material of the upper end of ribbon 98 of FIG. 10 causes the droplet 99 to ride in the position shown by the solid line, and if a sufficient voltage on strip 97 causes the droplet 99 to ride in the position shown by the dotted line, then both positions, the first with less voltage and the second with sufficient voltage, can represent a stable dynamic equilibrium state.

The surfaces following strips 61 shown in FIG. 3 will vary depending on the method used to select droplets for departure and other droplets for continuing on the surface. It is even possible that all droplets could be allowed to leave at the ends of the strips. Those droplets riding lower on the strips could later contact one surface, possibly the one bearing the strips; while those riding higher would eventually proceed to another surface, never contacting the one surface contacted by droplets riding lower. One of numerous possibilities for further droplet travel would include the further strips 63, which can have a voltage always applied to them between them. Depending on various factors such as the position of the center of gravity of droplets riding lower, and the curvature of and extension of droplet surfaces contacting the strips, the strips 63 may be located higher or lower than the strips 61, in order to intercept droplets riding lower but not intercept droplets riding higher. The strips 63 are not necesssary; and a surface not including the strips and possibly of less curvature could guide droplets to a gutter.

Droplet 49 of FIG. 3 is one of the droplets pulled by voltages on strips 61 closer to the surface of strips 63. It has impacted strips 63 and will eventually be sucked into and out through hole 42, which eventually leads to a gas-ink separator. Parts of droplets may also contact surface 55 and be drawn into hole 42. As mentioned before no or relatively low voltage was applied between strips contacting droplet 51 during its transit, so the droplet proceeded out of the cover assembly at slot 52.

Surface 54 is shaped and positioned such that the droplets all contact stripe 61 roughly at the apex of 54. Its curvature can vary along a strip, and there may be jogs in the surface, such as at the transition between strips 61 and strips 63.

The gas leaving at 42 or similarly saturated gas is returned at 41, as discussed for other cover assemblies. The cover 56 is hinged at hinge 53. The cover 56 is curved to cause smooth gas flow down past slit 52 toward exit 42. The gas flow will collect mist and small droplets, which may break away from droplets during acceleration. Ink collected at the hole between surfaces 54 and 55 proceeds out with gas flow at exit 42.

As mentioned before, the methods of selecting which droplets will lift off from the side by side strips are applicable to systems other than that shown in FIG. 3. For example, the methods illustrated in FIGS. 4 through 7 and in FIGS. 10 and 11 are also applicable to the drum shown in FIG. 1. In this case the radius of the drum might be 0.08 inches, the sites might be 0.008 inches apart, the droplets might be 0.002 inches in diameter, and droplet speed might be 800 inches per second. Larger droplets would imply larger dimensions throughout. Since there are many possible variations in design, the numbers are only meant to give an order of magnitude feeling for compatible dimensions and may be off by a factor of two or more.

Since not all sites on a drum will be actively controlling droplets simultaneously, those sites used at a particular time may be connected electrically with one or more inactive sites. In some designs only one site per stream may be actively controlling a droplet at a given time. If the ribbon type droplet release method shown in FIGS. 10 and 11 is used, then in one possible design the whole perimeter of a disc may be considered as a single site, only one droplet being on it at a time.

The effects of voltage magnitude; separation of strips, related to possible sparking; thickness of insulation on strips, if any; and the arrangement of voltages and biases will be discussed together with materials affecting ink contact angle and dielectric breakdown. All considerations mentioned in this paragraph could affect the lower limiting size of droplet diameters for various types of ink.

The third aspect of this invention will provide a few specific combinations of ink and strip materials. The strip materials include a contacting surface, a spark resistant layer, and a conducting or semiconducting layer. Water based inks will be discussed second, metallic inks will be discussed first, and other types of ink will only be convered by inference.

The three most important aspects of the ink guiding strips variously labelled 71, 72, 73, 74, 91, and 97, aside from the fact that they must contain some conducting or semiconducting layer, are first, that they must have an outer surface which will produce a reasonable contact angle, not zero, with the ink; second, that an effective electrical current barrier, to prevent sparking and corrosion, must exist between the conducting part of the strips and the ink; and third, that the thickness of any insulating layer, coupled possibly with an additional layer to produce proper contact angle, should be small enough to require a reasonably small voltage for operation.

An example will now be given of a liquid-metal ink coupled with a particular strip construction. The strips in FIGS. 4 through 8 can be constructed in part of a wire. On the surface of the wire, at least in portions that will oppose ink, will be a layer of tantalum or aluminum. Of course the whole wire may be aluminum. The oxide of the metal will be formed above this layer until a sufficiently voltage resistant layer is built up by techniques familiar in thin film technology for forming capacitors. Any of various other metals and other capacitor dielectric layers may be employed.

The surface energy of the oxides will be high compared with that of almost any glass. Thus a layer of glass having a relatively low surface energy may be added above the already formed dielectric layer, to increase the contact angle of an ink composed of one or more metals, such as lead, bismuth, tin, and cadmium. The glass may be deposited by various thin film techniques, such as sputtering in a vacuum. A very thin film of glass may be used, and perfect coverage is not essential, if a very large percentage of the surface is covered, since surface energy associated with contact angle tends to average, and since the sparking breakdown characteristics, which are sensitive to tiny pinpoint imperfections, are secured by the previous dielectric layer. The purpose of the new layer, as mentioned above, is to decrease surface energy and thus increase the contact angle of the liquid metallic ink with respect to the contacted strip surface.

According to U.S. Pat. No. 3,596,285 a metal alloy composed as follows will have a melting point of 158 degrees F. This is well below the melting point of any glass and about as warm as the water in a typical hot water heater. The alloy is 50 parts bismuth, 26.7 parts lead, 13.3 parts tin, and 10 parts cadmium. Of course other metals and mixtures could be used. The surface 77 in FIGS. 4 through 8 between the strips can be polyethylene or glass or any surface not attacked by the ink or atmosphere and forming a reasonably large contact angle, as mentioned in previous discussions.

In FIG. 10 the ribbon 98 can be glass or some other inert dielectric with a relatively high melting point and appropriate surface energy, depending on the method of droplet lift off as discussed before. The conducting part of strips 97 would be plated onto ribbon 98 by one of various thin film techniques, possibly with the help of a material to cause the strips to wet the surface of ribbon 98. Next a dielectric layer to prevent sparking is formed on the strips, and a glass layer is formed above this. The glass may also cover the exposed part of ribbon 98.

The advantage of this construction using two surfaces above the conductor is that the capacitance per unit area between a droplet and the conductor can be greatly increased over other techniques, because an extremely thin dielectric layer with high breakdown potential is formed. Simultaneously, a low surface energy is achieved by an extra layer, to allow high contact angles with the ink, without adding much to the dielectric thickness. The relation between thickness and voltage necessary to separate droplet trajectories will be discussed next.

If one wishes to add, through the application of a voltage between a droplet and a strip, an amount of energy equivalent to that of the surface tension of mercury then we have the equation for energy $$\tfrac{1}{2}CV^2 \text{ equals } 5.4 \times 10^{-5} \text{ Joules} \times A$$

where A is the area of droplet contact with the strip. C equals $eA/d$, where $e$ is the dielectric coefficient of the dielectric covering on the strip, and d is the thickness of the dielectric covering. Actually e may have two different values, since there may be two or more dielectrics used.

To get a feeling for thickness of covering versus voltage, assume that the dielectric constants are all equal to that of air. This will tend to underestimate thickness by a factor of at least two. Under this assumption the following voltages imply the following thicknesses using the above equations.

1000 volts–$8.195 \times 10^4$ Angstroms or $8.195 \times 10^{10-4}$ cm. or 0.0003226 inches 100 volts–819.5 Angstroms 32 volts–81.9 Angstroms 10 volts–8.19 Angstroms or a few atomic radii When dielectric constant is taken into account the above thicknesses can easily be doubled.

If we are willing to use droplets about 0.003 inches in diameter, with strip pairs placed less than 0.005 inches apart on centers between strip pairs, using voltages of about 1000 volts and dielectric thicknesses of 0.0008 cm., then the strips can be easily constructed using as the dielectric standard polyethylene or polypropylene films produced currently on a commercial scale. But it is preferred to reduce the voltage to 100 volts or less and to reduce droplet size to at most 0.002 inches. This is possible using the double layer described above, in light of the following information.

In U.S. Pat. No. 3,670,130 it is stated that "an anodized tantalum film can be made that can have a capacity of 0.1 microFarads/cm.$^2$ and will withstand a potential of 100 volts applied across it". This will give $5 \times 10^{-4}$ Joules/cm.$^2$ or about 10 times the surface energy of mercury. The oxide layer may be a couple thousand Angstroms thick in this case. The electrical surface energy per cm. will be reduced by the addition of a thin layer of glass deposited above the oxide. If the added layer is only a couple thousand Angstroms or less, and the dielectric constant of the glass used is about four times that of vacuum, then the electrically induced surface energy will be reduced less than 50 percent by the additional glass layer added to the tantalum oxide layer. The energy will still be five times that of a mercury surface. Thus control voltage between the ink and strips could be further reduced from 100 volts and still produce a noticable change in contact angle.

Also remember that it is not necessary to cause the contact angle of the ink to become zero on the surface of the strips when voltage is applied. It is sufficient to cause the contact angle to change by a sufficient amount to cause droplets to which sufficient voltage is applied to take a different path from droplets to which less or no voltage is applied.

The concept of sufficient voltage and less voltage is introduced to cover the case in which bias voltages may be used. Since the surface energy is proportional to the square of the voltage, a bias voltage may be added to the information voltages to increase the effect of an information voltage applied between cooperating strips.

The nearest strips of neighboring pairs of strips may have voltages of the same sign relative to some average voltage. Thus consecutive side by side strips may have a voltage pattern as follows; $+--++--+$. The sign reversals may not be necessary if each strip is thoroughly insulated in all directions.

Since small parts of droplets and other impurities may be left on strips after the droplets depart, it may be helpful to change the direction of applied voltages between strips periodically, after each droplet or after each few droplets pass. It may even be helpful to apply alternating voltage with a frequency higher than that of the droplets, between strip pairs. This will prevent an uncontrolled buildup of charge on any strip surface.

The combination surface strips consisting of a metal, a thin very spark resistant dielectric layer immediately above the metal, and thin low energy surface such as glass above the dielectric layer can be applied in other arts. For instance, the combination can be applied in the electrostatic switches first shown in U.S. Pat. No. 3,955,059, assigned to the author of this application. In U.S. Pat. No. 3,955,059 a globule of mercury is switched from a chamber to any neighboring chamber, through a constricted region therebetween, thus allowing latching. The mercury is drawn by voltage between two opposing plates similar to each strip shown in FIG. 10. Each pair of opposing plates extends into the constricted region between chambers. An electrical switch, a fluid path switch, and an optical path switch of the designs shown in the above patent have already issued as patents. The switching voltages are comparble to those discussed in this current application, including the use of possible bias voltages. The size of droplets can be comparble, but the size of chambers and globules within the switches would probably be larger than the droplets of this current application.

In U.S. Pat. No. 3,596,285 the metallic ink in liquid stream form was directed onto a carrier of impervious steel, having an oxide coating formed by anodization. The carrier temperature is roughly room temperature and lower than the ink melting point. Thus the metallic ink hardens on the carrier forming letters and symbols, which can be scraped off as the carrier passes a certain point.

In addition to the use expressed in the former patent, it would be possible to form metallic type to be used in printing presses by allowing metallic droplets to harden in appropriate places, the droplets then forming the type. The type could be built up on an appropriate thin carrier plate, which can be wrapped onto a cylinder or attached to a flat press plate. One or more droplets can impact and be added to each position requiring a raised surface. Any printer capable of handling metallic ink in sufficient volume can be used to form the type.

The carrier plates could be fed past the droplet printer automatically one after another. As a carrier plate passes the droplet printer raised metallic type is formed on the surface of the plate and sticks to the surface. The carrier plates can then be attached to a printing press, which may use the plates flat or substantially cylindrically. After all copies are printed at the press, then the raised metallic type may be scraped off or melted off and reused as ink in the droplet printer. This use is meant to be suggestive and there are many abvious modifications. An ink stream rather than droplet printer may be used.

In addition to building type on the carrier plates, representations of photographs and other information can be built up on the carrier plate by depositing droplets of melted metallic ink in appropriate places. The type and the photo representations need not be held in place by anything other than adhesion to the carrier plate surface. The format and the type and photos could be represented by information on a computer tape, which tape could also supply advance representations of the same, whether on a video display or on a direct printer output.

Of course in working with an ink of higher melting point than room temperature it is necessary to keep various parts of the ink circulating system at a high enough temperature to keep the ink liquid. For instance the catcher, the orifices, the pressure pump, any collection pump, and lines leading between any of these must be kept at a sufficient temperature to keep the ink from solidifying, and they must be capable of reheating the ink upon startup of the printer after it has been idle for a while. A heater circuit may be included in the ink lines leading between other system parts. The heating may be electrical or by heat conduction from a fluid such as hot water circulating outside the lines. Other obvious heating systems may be used.

Another use for metallic ink might be the wiring of circuits. An electric line formed by hardened droplets of metallic ink could be formed between connector terminals on an otherwise dielectric surface. Circuits could be rapidly wired. The wiring could then be protected by an additional dielectric coating. If the protecting coating is omitted, then the wiring could, if desirable, be removed by melting or dissolving the lines in acid. As is common in the semiconductor industry, some lines could be protected while others are etched away. New lines can then be added where appropriate. Thus rewiring can be done rapidly.

Turning now to water based inks, the surface tension, i.e. surface energy, of water is an order of magnitude less than that of metals. Thus lower energy surfaces are needed for printers using water based inks. Glass would produce a substantially zero contact angle with water, and is thus inappropriate for a printer strip surface if water based ink is to be used. Polyethylene, polypropylene, graphitized carbon, teflon and various other organic polymers, and silver all have low enough surface energy to produce contact angles of roughly ninety degrees with water.

The fact that the surface energy of water is lower than that of metals implies that a lower electrically applied surface energy addition, and thus lower voltage, is required to produce a change of contact angle on the strips. To put things in perspective, without using sophisticated techniques to reduce operating voltage, the dielectric constant of polyethylene is 2.26, and the surface tension of water is about 72 dynes/cm. Therefore approximately 243 volts across a thickness of polyethylene of 0.000323 inches will produce an applied surface energy equivalent to the surface energy of water. Thus if voltages of that magnitude are acceptable, then polyethylene, in a commercially available thickness, can be used as the dielectric which covers the metal core of the strips pictured in the figures.

The lower limit of voltage is determined by the lower limit of thickness of dielectric which can be produced and which can withstand the compatible voltage. The thickness to produce a given surface energy is proportional to voltage squared. As very small thicknesses are approached, the electric field within the dielectric necessary to produce the required energy increases, and electrical breakdown becomes more likely. To avoid electrical breakdown at very small thicknesses it is possible to use a very thin very spark resistant additional layer, such as tantalum oxide in the metallic ink application, and to cover the metal and oxide layers with a thin layer of polyethylene. If stretched, the polyethylene may be attached between the strips, rather than applied directly to the strips.

The polyethylene can be applied to a wire in various ways. It can be melted and pressed thin, much thinner than commercially available, in a precision press. Rather than applying the polymer to a wire, the metal can be applied to a formed film of polyethylene. The film should be made thin by pressing, or in some other way, before the metal is applied in a manner similar to the aluminizing of mylar. The film can then be rolled into a configuration resembling a wire, with the polymer representing the outermost layers. A similar rolling technique is used in making capacitors. The polyethylene can be replaced in the process by any organic dielectric causing an acceptable contact angle with water and having suitable metalizing properties. Instead of starting with the metal and coating its surface with a dielectric cover, we are starting with the dielectric cover and coating it with a metal (metalizing its surface). Electrical contacts must be made by some means such as a bead or tab at the end of the wrapped pseudo wire. The bead or tab may be placed on the films before wrapping. The wrapped strips would then be attached in a fixed way to a supporting surface, possibly by cementing. The supporting surface may be pregrooved to accept the wires in exact positions.

The metalized dielectric film can be used directly, without wrapping, as the flat strips 97 in FIGS. 10 and 11. They must be attached, possibly by cementing, with the metalized surface inward and the dielectric surface facing away from the ribbon 98. The surface between the strips can be polyethylene, polypropylene, or a material coated with a dielectric substance causing water to form a reasonable contact angle with said substance.

Other ways of forming strips with thin dielectric coatings will occur to those skilled in the art of thin film technology and capacitor production. The art of paint making can also be related to a method of strip formation. Linseed oil and possibly other oleoresinous binders are used to increase the hydrophobic character of pigment particles, such as titanium oxide or zinc oxide. When linseed oil dries, the molecules link up and become elongated, forming a solid surface upon curing. Surface active agents to cause the oil to wet pigments have been studied extensively. It should be possible to form a thin dielectric oxide layer on a metal and then to cause a thin layer of linseed oil to dry on the oxide surface, thus making the outermost surface hydrohobic.

As another example of strip formation, it is common to make rubber truck tires conducting by adding large amounts of carbon. It should then be possible to impregnate a dielectric plastic such as polyethylene with carbon and to form the resulting material into strips or wires. If the surface carbon is removed to a sufficient depth into the resulting wire, then the plastic can be heated at the surface by high frequency alternating current to fill in the voids thus created. This will result in a conducting core surrounded by plastic. The resulting wire can be used as one of the conducting strips shown in the figures. Even if the carbon is not thoroughly covered, it is hydrophobic. To prevent unwanted reactions with certain inks, the carbon should be covered as described above.

As a final example of a way to form a thin dielectric coating, it is known in the art of glass working, that a rod can be made of two types of glass, an inner core which can be easily etched and an outer layer resistant to etching. If such a rod is softened and drawn to a thin filament, then the center can be etched out leaving a thin film glass tube. The tube can be filled with liquid metal under pressure, thus producing a metal wire surrounded by a very thin glass coating, after the metal hardens. The resulting wire is suitable in applications using metallic ink.

The figures give a two dimensional view of three dimensional droplet which has no axis of symmetry while contacting the surface of a printer. Thus the figures are meant to be suggestive of surface outline at a particular representative cross-section. The cross-section and even general curvature features will change from the front to the back of a travelling droplet, if cross-sections are taken substantially perpendicular to the strips as in the figures. The contact angle will also change somewhat along a droplet's contact perimeter.

The discussions of contact angle were made neglecting the effects of hysteresis. Actually the trailing edge of droplet will have a slightly smaller contact angle than that of the leading edge. Thus when I speak of a contact angle I mean an verage contact angle, usually when no voltage is applied, unless voltage is mentioned. The contact angle, of course, affects the direction of force applied to a droplet by surface tension. It also affects the extent of the perimeter along which this force is applied. To greatest effects from applying a voltage will occur when the perimeter and force component in the droplet acceleration direction can change most, as a first approximation to understanding the effects of contact angle. Thus larger contact angles before voltage application are preferred, since the contact angle cannot be decreased below zero, and since the rate of change of contact angle with change of applied voltage is largest for angles near ninety degrees and approaches zero for small angles. Thus it is preferred that the portions of outer surface on the strips produce a contact angle of at least sixty degrees.

In the claims the phrase, an associated geometrical surface, will be used to denote a surface within a conductor, which surface can be held at one or more applied voltages, one voltage at a time. The dielectric surface above the conductor or the surface of the conductor itself, but not the associated geometrical surface, will actually contact the ink. Some of these outer ink contacting surfaces, which each exist above a respective conductor's associated geometrical surface, will be called special portions of surface. In other words, the conducting part of each strip in FIGS. 3-11 contains an associated geometrical surface which is maintained at the voltage applied to the conductor. The outer part of each strip, to which the geometrical surface is associated, contacts ink. The contact angle for a particular strip or portion of surface thereon is affected by the voltage induced between the associated geometrical surface within the conductor part of the strip and a droplet. If the voltage applied to a geometrical surface associated with a strip can be varied on command, then the largest area of the strip surface on which the contact angle with at least some droplets will be affected by the amount of voltage applied will be called an active area. The conductor within which the geometrical surface resides can, of course, be a semiconductor.

Any set of strips contacted simultaneously by a droplet and having an active area, which determines droplet contact angle on command, will be called a control set. FIG. 4 shows a control set in cross-section consisting of strips 71 and 72 and another control set 73 and 74. The voltage between strips 71 and 72 is sometimes changed from one droplet to the next. In FIG. 3, 61 represents the strips of one or more control sets, but 63 represents the strips of sets not used for control, since the same voltage is always applied at the strips of 63, no attempt being made to apply different voltages to successive droplets on strips 63. 63 is a secondary guiding surface, guiding only droplets which are not chosen to proceed to an output means.

Figure 12:
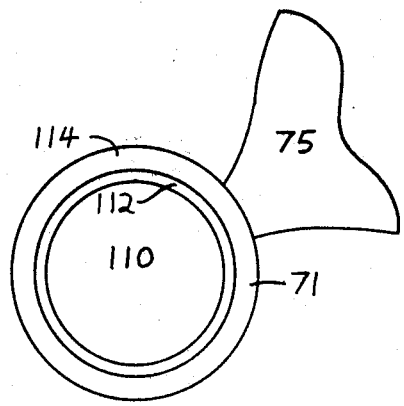
FIG. 12 is a blow up of strip 71 of FIG. 4 and part of droplet 75.

The combination comprising a conducting layer, a spark resistant layer suitable for a capacitor dielectric, and a layer producing a significant contact angle with a conducting liquid will be claimed as a component of larger devices. The combination is shown in FIG. 12, where 110 is a conducting layer, 112 is a spark resistant layer, and 114 is the layer producing significant contact angle with liquid 75. The combination is shown as strip 71 of FIG. 4.

Beyond the preferred embodiments disclosed herein there are other obvious variances of the present invention which fall within the spirit and scope thereof as defined by the appended claims.

What is claimed is:

1. A device which comprises a structure which produces at least one stream of ink, which stream eventually breaks into separate droplets of ink, the ink of said at least one stream of ink contacting a surface of at least one solid containing a number of special portions of the surface, each one of said number of special portions of the surface having a respective associated geometrical surface at some small depth interior to and roughly locally parallel to the special portion of the surface with which it is associated, and each said associated geometrical surface being controllable to exist at any of at least two voltage states at any instant during normal operation, assuming that appropriate control signals are stimulated during an interval shortly preceding and including that instant, each droplet contacting at least one of said number of special portions of said surface, the voltage difference between said droplet and said geometrical surface associated with any one of said special portions of surface contacted by said droplet altering the range of contact angles of said droplet with said special portion of surface contacted depending on said voltage difference, each said range of contact angles in turn determining in part the range of acceleration force resultants during contact applied to a droplet during contact with said special portion of surface, the net history of acceleration applied during contact with said surface of at least one solid in turn determining whether or not a particular droplet will be selected, i.e. will contact, solidify, and substantially remain, at least until removed therefrom, on an output receiving means, which means may be at least one anodized metal sheet conveyed past the said device, the ink of said device consisting mainly, if not entirely, of metal.

2. A process comprising the steps of forming at least one stream of liquid, which stream eventually breaks into separate droplets, causing each droplet broken from said stream to contact at least two solid strips simultaneously, not necessarily the same two strips for each droplet, controlling the range of contact angles of each said droplet on the surfaces of said at least two solid strips by applying electrostatic forces, which forces are sometimes changed in response to control signals and in turn cause a change in the range of contact angles from those of one droplet to those of the next on said at least two strips, each said range of contact angles in turn determining in part the range of acceleration force resultants during contact applied to a droplet during contact with said at least two strips, causing each droplet, because of relative motion, momentum, and other effects, to contact and leave at least a border of some small area at the far ends of the active areas of the last of the sets of at least two strips contacted simultaneously on which the droplet's range of contact angles can be changed during normal operation of the process by changing controlling electrostatic forces in response to control signals, the border of the same said small area being contacted whether or not controlling electrostatic forces have been applied to the droplet, the word far referring to a droplet's trajectory, near things being passed first and far things being pass last, the relative velocity between the droplet and the said small area being at least half the velocity of the droplet with respect to the origin of said stream, varying the final position of the center of gravity of a droplet with respect to said small area at the time when the forward half of a droplet leaves for the last time contact with the border of said small area by varying its contact angles while contacting the strips, said final position determining whether or not a particular droplet will reach an output droplet receiver, such as paper on a roller or a chemical reaction chamber.

3. The process of claim 2 further including the step of causing those droplets which will not reach said output droplet receiver to contact a bridging surface, said bridging surface being the surface between the last of said at least two strips contacted simultaneously on which the droplet's range of contact angles can be changed in response to control signals; whereas those droplets which will reach said output droplet receiver do not contact said bridging surface.

4. The process of claim 2 in which the said final position is varied mainly perpendicular to the trajectory of the droplet rather than along the trajectory.

5. A device which comprises a structure which produces at least one stream of liquid, which stream eventually breaks into separate droplets of liquid, a number of solid, as opposed to liquid, strips each being contacted by the liquid of said at least one stream, the liquid being in droplet form at some time during contact with the strips, a respective associated geometrical surface associated with each respective said strip, each said geometrical surface being located at some small depth interior to and roughly locally parallel to at least a portion of the surface of its respective strip, which portion contacts the liquid of said stream in droplet form, the associated geometrical surfaces being within parts of the strips with which they are associated, each said droplet contacting at least two strips simultaneously at some time, not necessarily the same two strips for each droplet of said at least one stream, means to apply a voltage difference and vary said voltage difference on command, i.e. in response to control signals, the voltage difference being applied between the geometrical surfaces associated with a first and second of a respective said at least two strips contacted simultaneously by a respective droplet, each of the two respective geometrical surfaces being at each instant substantially a respective equipotential surface when said voltage difference is applied between them, said voltage difference varied on command causing varied electrostatic forces, which in combination with other forces, such as surface tension, cause a tendency toward a range of contact angles of said droplet with at least one of said strips contacted, said range being a function of said voltage difference and other variables, each said range of contact angles in turn determining in part the range of acceleration force resultants during contact applied to a droplet during contact with said at least two strips, each area on which varied electrostatic forces caused by voltage differences varied on command affect contact angle for some droplets being called an active area, and further comprising one respective special area defined for each respective droplet, assuming normal operation of the device, said one respective special area being part of the far end of an active area and being contacted at least at its border by a droplet no matter which of the possible trajectories is chosen for the droplet assuming normal operation of the device, said one respective special area being on the last to be contacted set of strips having a means to apply a voltage difference and vary voltage difference on command between the associated geometrical surfaces of at least two of said set of strips to be contacted simultaneously by a respective droplet, said last set of strips being called the final control set for a respective droplet, said one respective special area being at the last part of an active area of said final control set passed by the respective droplet no matter which of its possible trajectories the respective droplet is on, assuming normal operation of the device, and further comprising means to vary the respective position of the center of gravity of each droplet, with respect to said one respective special area, at the time at which the forward half of each droplet leaves for the last time the boundary of its said one respective special area, said position being determined, among other factors, in part by the respective electrostatic forces applied to affect droplet contact angles with respect to at least some areas of said strips contacted, and in part by the shape of the boundary of said special area, said position determining whether or not a particular droplet will reach an output means, such as paper on a roller, the relative velocity between the droplet and the said one respective special area being at least half the velocity of the droplet with respect to the origin of said at least one stream of liquid.

6. The device of claim 5 further comprising a central solid surface located between the at least two strips of each final control set, but not being an extension of the active area of a strip or strips, whether or not a respective droplet contacts said central solid surface determining whether or not the respective droplet reaches said output means on a droplet by droplet basis.

7. The device of claim 5 wherein said means to vary said respective position of the center of gravity is chosen and the shape of said respective special area can be chosen such that said respective position is varied mainly perpendicular to the trajectory of the droplet rather than along the trajectory.

8. A device which comprises a structure which produces at least one stream of liquid, which stream eventually breaks into separate droplets of liquid,
- a number of solid, as opposed to liquid, strips each being contacted by the liquid of said at least one stream, the liquid being in droplet form at some time during contact with the strips, said number being at least two,
- a respective associated geometrical surface associated with each respective said strip, each said geometrical surface being located at some small depth interior to and roughly locally parallel to at least a portion of the surface of its respective strip, which portion contacts the liquid of said stream in droplet form, the associated geometrical surfaces being within parts of the strips with which they are associated, each said droplet contacting at least two strips simultaneously at some time, not necessarily the same two strips for each droplet of said at least one stream,
- means to apply a voltage difference and vary said voltage difference on command, i.e. in response to control signals, the voltage difference being applied between the geometrical surfaces associated with a first and second of a respective at least two strips contacted simultaneously by a respective droplet, each of the two respective geometrical surfaces being at each instant substantially a respective equipotential surface when said voltage difference is applied between them,
- said voltage difference varied on command causing varied electrostatic forces, which in combination with other forces, such as surface tension, cause a tendency toward a range of contact angles of said droplet with at least one of said strips contacted, said range being a function of said voltage difference and other variables, each said range of contact angles in turn determining in part the range of acceleration force resultants during contact applied to a droplet during contact with said at least two strips, each area on which varied electrostatic forces caused by voltage differences varied on command affect contact angle for some droplets being called an active area, the last set of strips having a means to apply a voltage difference and vary voltage difference on command between the associated geometrical surfaces of at least two of said strips which are contacted simultaneously by a respective droplet to be contacted by a respective droplet being called the final control set for that respective droplet,
- and further comprising a bridging surface between the strips of each said final control set, each respective droplet contacting the said respective bridging surface of said final control set for that respective droplet, said contacting being done at least at a part of the bridging surface which is not an active area,
- the respective history of net acceleration occurring during contact with active areas on strips determining whether or not each respective droplet will reach an output means, such as paper on a roller.

9. The device as in claim 8 wherein said bridging surface rises to a ridge between the at least two strips of said final control set between the associated geometrical surfaces of which a voltage difference will be applied and varied on command.

10. The device of claim 8 wherein the active areas of the said at least two strips of said final control set between the associated geometrical surfaces of which a voltage difference will be applied and varied on command are mutually facing substantially away from each other.

11. The device as in claim 8 further comprising at least one ribbon shaped section of dielectric material, which may be part of a larger dielectric washer, which may be part of a dielectric disc, the at least two strips of said final control set between the associated geometrical surfaces of which strips a voltage difference will be applied and varied on command residing on opposite sides of said ribbon shaped section of dielectric material.

12. A process comprising the steps of forming at least one stream of liquid, which stream eventually breaks into separate droplets,
- causing each droplet broken from said stream to contact simultaneously, but not necessarily at first contact for each thing contacted, at least two solid strips and a solid surface between them, not necessarily the same two strips for each droplet,
- controlling the range of contact angles of each said droplet on the surfaces of its respective said at least two strips, but not on the solid surface between them, by applying electrostatic forces, which forces are sometimes changed in response to control signals and in turn cause a change in the range of contact angles from those of one droplet to those of the next on at least part of the contacted area of said at least two strips,
- each said range of contact angles in turn determining in part the range of acceleration force resultants during contact applied to a droplet during contact with said at least two strips, the net acceleration force on a droplet during its contact with said at least two strips, in turn, determining whether or not a particular droplet will reach an output droplet receiver, such as paper on a roller or a chemical reaction chamber.

* * * * *